(12) United States Patent
Chiba et al.

(10) Patent No.: US 9,077,225 B2
(45) Date of Patent: Jul. 7, 2015

(54) ARMATURE OF ELECTRIC MOTOR AND METHOD FOR MANUFACTURING ARMATURE OF ELECTRIC MOTOR

(75) Inventors: Teiichirou Chiba, Hiratsuka (JP);
Daisuke Yoshida, Hadano (JP);
Shunichi Koshiyama, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 727 days.

(21) Appl. No.: 13/128,007

(22) PCT Filed: Dec. 21, 2009

(86) PCT No.: PCT/JP2009/071238
§ 371 (c)(1),
(2), (4) Date: May 6, 2011

(87) PCT Pub. No.: WO2010/074027
PCT Pub. Date: Jul. 1, 2010

(65) Prior Publication Data
US 2011/0210642 A1    Sep. 1, 2011

(30) Foreign Application Priority Data

Dec. 26, 2008  (JP) ................................. 2008-334425

(51) Int. Cl.
*H02K 3/14*  (2006.01)
*H02K 3/28*  (2006.01)
*H02K 15/095*  (2006.01)

(52) U.S. Cl.
CPC ............... *H02K 3/28* (2013.01); *H02K 15/095* (2013.01)

(58) Field of Classification Search
USPC ......................... 310/201–208, 260
IPC ......................................................... H02K 3/14
See application file for complete search history.

(56) References Cited

U.S. PATENT DOCUMENTS

| | | | |
|---|---|---|---|
| 5,955,810 A * | 9/1999 | Umeda et al. ................. 310/208 |
| 6,107,718 A * | 8/2000 | Schustek et al. ........ 310/216.086 |
| 6,806,611 B2 * | 10/2004 | Bharaj et al. .................. 310/208 |
| 6,841,913 B2 * | 1/2005 | Gorohata et al. ............. 310/180 |
| 2007/0181732 A1 | 8/2007 | Noji |
| 2011/0156523 A1 * | 6/2011 | Kljaic et al. .................. 310/208 |

FOREIGN PATENT DOCUMENTS

| | | |
|---|---|---|
| CN | 1756048 A | 4/2006 |
| JP | 8-182238 A | 7/1996 |
| JP | 2002-044891 A | 2/2002 |
| JP | 2003-204659 A | 7/2003 |

(Continued)

OTHER PUBLICATIONS

International Search Report of corresponding PCT Application No. PCT/JP2009/071238, Sep. 2, 2010.

(Continued)

*Primary Examiner* — Dang Le
(74) *Attorney, Agent, or Firm* — Global IP Counselors, LLP

(57) ABSTRACT

A stator is provided with a core and a winding. The core includes a plurality of slots and a plurality of teeth formed between the slots. The winding is composed of a plurality of wires W bundled in an irregular arrangement. The winding includes a plurality of coil portions wound on each of the teeth, and a connecting portion connecting the coil portions together. The winding has a twisted shape in the connecting portion.

18 Claims, 14 Drawing Sheets

(56) References Cited

FOREIGN PATENT DOCUMENTS

| | | |
|---|---|---|
| JP | 2004-180418 A | 6/2004 |
| JP | 2007-180058 A | 7/2007 |
| JP | 2008-035616 A | 2/2008 |
| JP | 2008-109829 A | 5/2008 |
| JP | 2008-109829 A | 5/2008 |

OTHER PUBLICATIONS

Chinese Office Action for the corresponding Chinese application No. 200980152723.0 issued on Jul. 23, 2013.

* cited by examiner

ARMATURE OF ELECTRIC MOTOR AND METHOD FOR MANUFACTURING ARMATURE OF ELECTRIC MOTOR

CROSS-REFERENCE TO RELATED APPLICATIONS

This national phase application claims priority to Japanese Patent Application No. 2008-334425 filed on Dec. 26, 2008. The entire disclosure of Japanese Patent Application No. 2008-334044 is hereby incorporated herein by reference.

TECHNICAL FIELD

The present invention relates to an armature of an electric motor and a method for manufacturing an armature of an electric motor.

BACKGROUND ART

An armature of an electric motor is generally provided with a core and a winding wound around the core. The winding is composed of a plurality of wires bundled together, and includes a plurality of coil portions and connecting portions for connecting the coil portions together. The core is provided with a plurality of slots and a plurality of teeth formed between the slots. Here, a single coil portion is provided to a single tooth in an armature structure referred to as a so-called concentrated winding. An example of an armature having a concentrated winding is disclosed in Japanese Laid-open Patent Application No. 2008-109829.

With the stator disclosed in Japanese Laid-open Patent Application No. 2008-109829, an annular core is divided into a plurality of divided cores for each tooth, and two wires are wound around the tooth of the divided cores in regular fashion to form a coil portion. With this armature, the windings are twisted so that the positions of the two wires are reversed between every Nth coil portion so as to satisfy predetermined conditions. The difference in inductance due to nonuniformity of the circumference length formed by each wire is thereby offset and the efficiency of the armature can be improved. Here, the two wires are wound on the tooth in a regular fashion, and the two wires are therefore rotated 180° while remaining parallel and are mutually reversed in position in the portion in which the wires are twisted.

The stator is manufactured in the following manner. First, a single divided core is held in a holding device, and two wires are wound in regular fashion around the divided core being held. The divided core on which the wires have been wound is moved along the axial line in the holding device, and is held in the holding device together with the next divided core. The wires are newly wound around the next divided core 6. This series of steps is carried out in consecutive fashion, whereby a plurality of coil portions are provided to a plurality of divided cores, respectively, and connecting portions for connecting the coil portions are formed in sequential fashion. The divided cores are assembled in an annular shape and secured together to thereby complete an armature.

SUMMARY

However, with an armature such as that described above, the wires must be accurately wound in predetermined positions and the wires must be twisted so that the mutual positions are accurately reversed while the wires are kept parallel to each other. In this step, it is very difficult to maintain a regular winding arrangement in the case that the number of wires is increased. Even when there are two wires, a step is required for winding the wires on the divided cores in the manner described above in order to maintain a regular winding arrangement. In this case, the cores must be divided into a plurality of divided cores and magnetic loss occurs at the boundary between the divided cores. It is therefore difficult to improve motor efficiency. Also, automation is difficult because of the need to maintain a regular winding arrangement.

On the other hand, multi-strand winding methods are conventionally used for winding numerous wires in an irregular arrangement on the teeth of a core. Multi-strand winding methods have a drawback in that the space factor of the wires arranged in the slots is low in comparison with the regular winding described above, but conversely have a considerable advantage in that automation is readily achieved. Conventionally, armatures formed by a multi-strand winding method are not known to have the problem of nonuniform wire inductance in the regular winding described above. This is due to the fact that an armature formed by a multi-stand winding method includes a plurality of wires wound in an irregular arrangement and therefore has a characteristic in which a wire imbalance does not readily occur as it does in the regular winding described above.

An object of the present invention is to provide an armature of an electric motor and a method of manufacturing same in which automation of the manufacturing step is facilitated and the motor efficiency can be further improved in an armature in which wires are wound in an irregular arrangement as described above.

The armature of an electric motor according to a first aspect includes a core and a winding. The core includes a plurality of slots and a plurality of teeth formed between the slots. The winding is made of a plurality of wires bundled together in an irregular arrangement. The winding includes a plurality of coil portions wound around each of the teeth, and a plurality of connecting portions connecting the coil portions together. The winding has a twisted shape in the connecting portions.

As described above, armatures formed by a multi-strand winding method are not known to have the problem of nonuniform wire inductance. However, the present inventor found that bias occurs in the arrangement of wires from a macroscopic viewpoint, even when the plurality of wires are arranged in an irregular fashion, and the bias is the cause of inductance nonuniformity. In view of the above, in the armature of an electric motor according to the present invention, the winding composed of a plurality of wires bundled together in an irregular arrangement has a twisted shape in the connecting portions. Accordingly, bias in the arrangement of the wires is reduced and inductance nonuniformity can be further reduced. It is thereby possible to increase the efficiency of the motor. The winding is composed of a plurality of wires bundled together in an irregular arrangement. The requirement for positional precision of the wound wires is less than the case in which the wires are wound in a regular arrangement on the teeth. Rigorous precision is not required to satisfy a particular relational expression or other conditions in relation to the position in which the wires are twisted. Therefore, the manufacturing step can be readily automated. For example, a plurality of wires can be simultaneously wound on the teeth to form a coil portion by moving the nozzle while a plurality of wires are fed out to an undivided and integrated core. Also, the wires are readily twisted when the connecting portions are formed.

The armature of an electric motor according to a second aspect is the armature of an electric motor of the first aspect, wherein the winding includes at least three of the wires.

With the armature of an electric motor according to the aspect described above, the wires have a twisted shape in an armature in which three or more wires are wound in an irregular arrangement. The inductance bias of each wire can thereby be further reduced and motor efficiency can be improved.

The armature of an electric motor according to a third aspect is the armature of an electric motor of the first aspect, wherein the connecting portions extend from the base of one of the teeth to the base of another of the teeth.

With the armature of an electric motor according to the aspect described above, the distance between the connecting portions and adjacent coil portions can be increased in comparison with the case in which the connecting portions are disposed from the base of a tooth across to the tip of another tooth. Non-conductivity between the connecting portions and adjacent coil portions can thereby be improved, and motor efficiency can be improved.

The armature of an electric motor according to a fourth aspect is the armature of an electric motor of the first aspect, wherein the teeth are provided on the inner peripheral side of the core, and the connecting portions are disposed on the outer peripheral side of the core.

With the armature of an electric motor according to the aspect described above, non-conductivity between the connecting portions and coil portions can be improved. Motor efficiency can thereby be improved.

The armature of an electric motor according to a fifth aspect is the armature of an electric motor of the first aspect, wherein the core is integrally formed as a one-piece unitary member.

With the armature of an electric motor according to the aspect described above, the manufacturing step can be readily automated in comparison with the case in which the core is divided. Also, the occurrence of magnetic loss can be suppressed and motor efficiency can be improved.

The armature of an electric motor according to a sixth aspect is the armature of an electric motor of any of the first to fifth aspects, wherein the connecting portions include a first connecting portion and a second connecting portion. With the first connecting portion, the winding is twisted 180° in a predetermined direction. With the second connecting portion, the winding is twisted 180° in a direction opposite the predetermined direction.

With the armature of an electric motor according to the aspect described above, the arrangement of the plurality of wires is reversed substantially 180° in the coil portions adjacent to the connecting portions in which the winding is twisted. Inductance nonuniformity of the wires can thereby be further reduced.

The armature of an electric motor according to a seventh aspect is the armature of an electric motor of any of the first to fifth aspects, wherein the winding is twisted a total of 180° among a plurality of the connecting portions.

With the armature of an electric motor according to the aspect described above, bulging of the winding due to its being twisted can be reduced in comparison with the case in which the winding is twisted 180° in a connecting portion in a single location.

The armature of an electric motor according to an eighth aspect is the armature of an electric motor of the seventh aspects, wherein the connecting portions include a first connecting portion in which the winding is twisted in a predetermined direction, and a second connecting portion in which the winding is twisted in a direction opposite the predetermined direction.

With the armature of an electric motor according to the aspect described above, the twisting direction of the winding is reversed in the first connecting portion and the second connecting portion. Accordingly, the relative position of the wires in an irregular arrangement is gradually changed and it is possible to avoid excessive force from being applied to the wires because the twist angle of a single change is small.

The method for manufacturing an armature of an electric motor according to a ninth aspect includes forming a plurality of coil portions, and twisting wires. In the forming of the plurality of coil portions, a bundled plurality of wires is wound in an irregular arrangement around a plurality of teeth formed on the core, thereby forming a plurality of coil portions wound around each of the teeth. In the twisting of the wires, between the formations of the individual coil portions, there are formed connecting portions that connect the coil portions together using the wires continuing from the coil portions and the wires are twisted in the connecting portions.

With this method for manufacturing an armature of an electric motor, the wires have a twisted shape in the connecting portions. Accordingly, inductance nonuniformity of the wires is reduced and motor efficiency can be improved. A winding includes coil portions that are formed by winding a bundled plurality of wires in an irregular arrangement on the teeth. Accordingly, the required positional precision of wound wires is lower in comparison with the case in which the wires are wound in a regular arrangement on the teeth. Therefore, the manufacturing step is readily automated. For example, a coil portion can be formed on an undivided and integrated core by simultaneously winding a plurality of wires on the teeth by moving a nozzle while feeding out a plurality of wires. Also, the wires can be readily twisted when the connecting portions are formed.

The method for manufacturing an armature of an electric motor according to a tenth aspect is the method for manufacturing an armature of an electric motor of the ninth aspect, wherein a nozzle for feeding out a plurality of the wires moves between the teeth, and the wires are thereby wound onto the teeth.

With this method for manufacturing an armature of an electric motor, the nozzle moves between the teeth to directly and simultaneously wind the plurality of wires around the teeth. The manufacturing step is thereby readily automated.

The method for manufacturing an armature of an electric motor according to an eleventh aspect is the method for manufacturing an armature of an electric motor of the ninth aspect, wherein the nozzle for feeding out a plurality of the wires moves along the teeth, and a catch member catches and inserts, between the teeth, the plurality of the wires fed out from the nozzle, whereby the wires are wound around the teeth.

With this method for manufacturing an armature of an electric motor, the plurality of wires fed out from the nozzle is moved by the catch member and wound around the teeth. Accordingly, the manufacturing step can thereby be readily automated even when the space between the teeth is narrow and the nozzle cannot move between the teeth.

The method for manufacturing an armature of an electric motor according to a twelfth aspect is the method for manufacturing an armature of an electric motor of the ninth aspect, wherein the connecting portions extend from the base of one of the teeth to the base of another of the teeth.

With this method for manufacturing an armature of an electric motor, the distance between the connecting portions and adjacent coil portions can be increased in comparison with the case in which the connecting portions are disposed from the base of a tooth across to the tip of another tooth.

Non-conductivity between the connecting portions and adjacent coil portions can thereby be improved, and motor efficiency can be improved.

The method for manufacturing an armature of an electric motor according to a thirteenth aspect is the method for manufacturing an armature of an electric motor of the ninth aspect, wherein the teeth are provided on an inner peripheral side of the core, and the connecting portions are provided on the outer peripheral side of the core.

With this method for manufacturing an armature of an electric motor, non-conductivity between the connecting portions and coil portions can be improved. Motor efficiency can thereby be improved.

The method for manufacturing an armature of an electric motor according to a fourteenth aspect is the method for manufacturing an armature of an electric motor of the ninth aspect, wherein the core is integrally formed as a one-piece unitary member.

With this method for manufacturing an armature of an electric motor, the manufacturing step can be readily automated in comparison with the case in which the core is divided. Also, the occurrence of magnetic loss can be suppressed and motor efficiency can be improved.

The method for manufacturing an armature of an electric motor according to a fifteenth aspect is the method for manufacturing an armature of an electric motor of any of the ninth to fourteenth aspects, wherein the wires are twisted 180° in a predetermined direction when a first connecting portion among the connecting portions is formed. The wires are twisted 180° in a direction opposite the predetermined direction when a second connecting portion is formed.

With this method for manufacturing an armature of an electric motor, the arrangement of the plurality of wires is reversed substantially 180° in the coil portions adjacent to the connecting portions in which the winding is twisted. Inductance nonuniformity of the wires can thereby be further reduced.

The method for manufacturing an armature of an electric motor according to a sixteenth aspect is the method for manufacturing an armature of an electric motor of any of the ninth to fourteenth aspects, wherein the wires are twisted a total of 180° among a plurality of the connecting portions.

With this method for manufacturing an armature of an electric motor, bulging of the winding due to being twisted can be reduced in comparison with the case in which the winding is twisted 180° in a connecting portion of a single location.

The method for manufacturing an armature of an electric motor according to a seventeenth aspect is the method for manufacturing an armature of an electric motor of the sixteenth aspect, wherein the wires are twisted in a predetermined direction when a first connecting portion among the connecting portions is formed, and the wires are twisted in a direction opposite the predetermined direction when a second connecting portion is formed.

With this method for manufacturing an armature of an electric motor, the twisting direction of the winding is reversed in the first connecting portion and the second connecting portion. Accordingly, the relative position of the wires in an irregular arrangement is gradually changed and it is possible to avoid excessive force from being applied to the wires because the twist angle of a single change is small.

The method for manufacturing an armature of an electric motor according to a eighteenth aspect is the method for manufacturing an armature of an electric motor of the ninth aspect, wherein at least three of the wires are included in the winding.

With this method for manufacturing an armature of an electric motor, the uncertainty of the positional relationships between the wires is increased during winding because the number of wound wires is greater. However, the inductance nonuniformity between the wires is reduced overall for the coils wound around a plurality of teeth because the wires are twisted in the connecting portions. Motor efficiency can thereby be improved.

In the present invention, nonuniformity of inductance of the coil can be reduced for each wire in a winding. The motor efficiency can thereby be improved.

DETAILED DESCRIPTION OF EMBODIMENTS
CONFIGURATION

Figure 1:
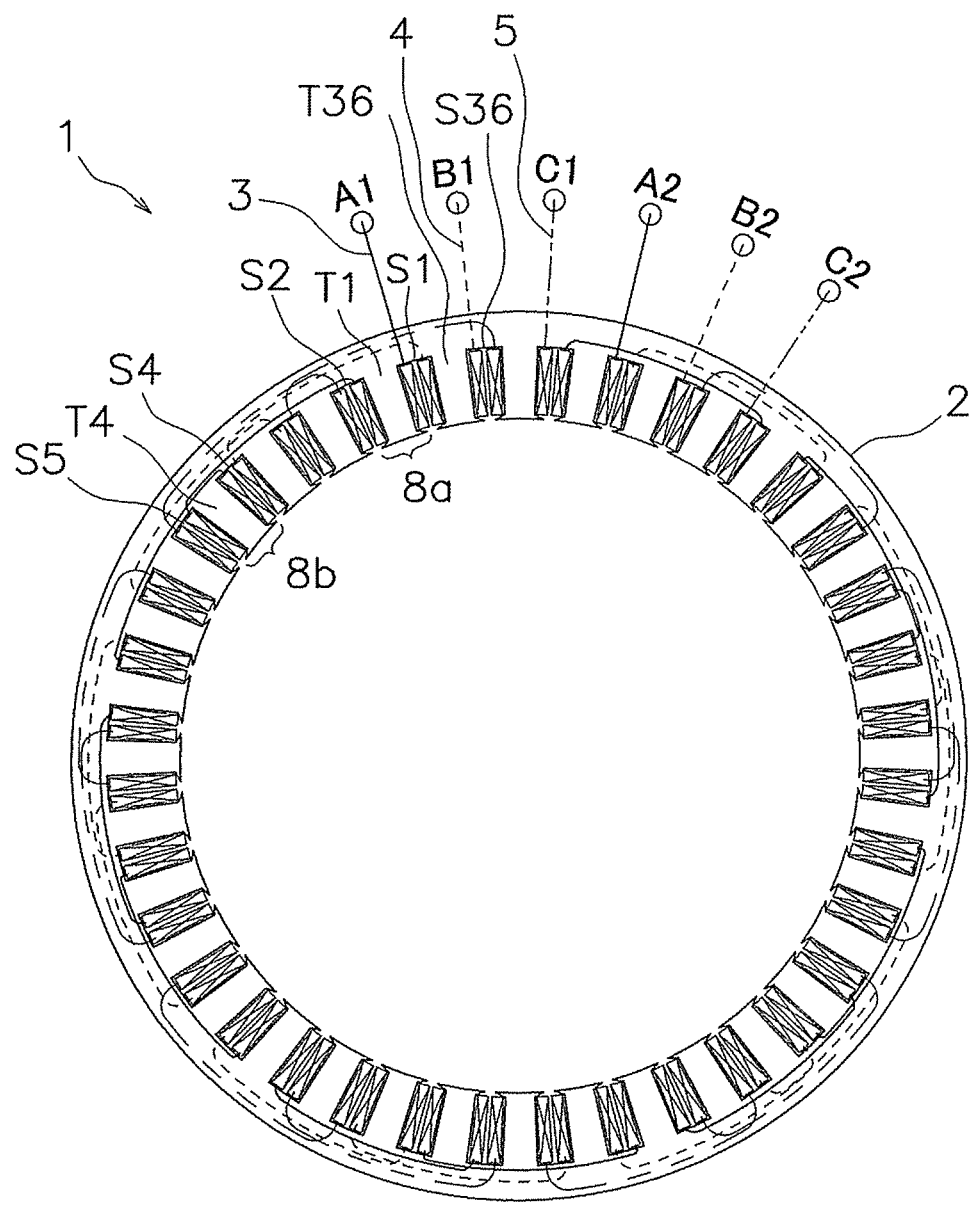
FIG. 1 is a schematic diagram showing the configuration of a stator.

FIG. 1 shows a stator 1 according to an embodiment of the present invention. The stator 1 is a stator provided to an inner rotor-type three-phase synchronous motor, and is a so-called concentrated-winding stator in which a single coil portion is wound around a single tooth. The stator 1 has a core 2 and windings 3 to 5.

Figure 2:
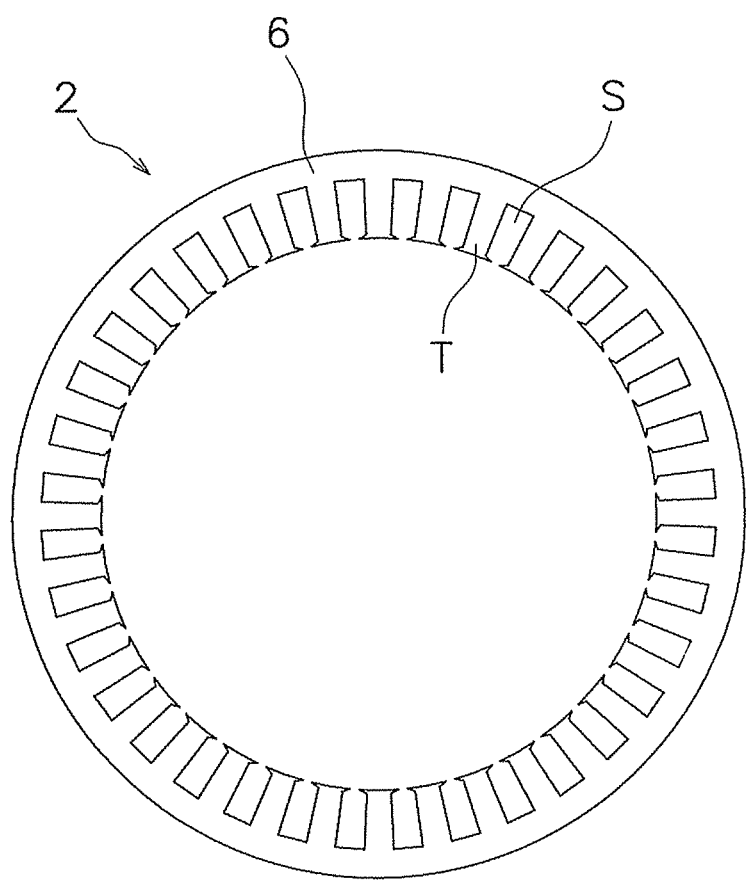
FIG. 2 is a diagram showing the shape of a core.

As shown in FIG. 2, the core 2 has an annular yoke 6, 36 teeth T, and 36 slots S. In FIG. 2, only a portion of the plurality of teeth and plurality of slots is marked with a reference numeral, and the other reference numerals have been omitted. The teeth T are provided on the internal peripheral side of the core 2 and project inward in the radial direction from the internal peripheral surface of the yoke 6. The core 2 is an integrally formed undivided core, and the teeth T are integrally formed with the yoke 6. The slots S are formed between the teeth T and are open facing the internal peripheral side of the core 2. In the following description, the inner side in the radial direction at each of slots S and teeth t is referred to as the "tooth-tip side" and the outer side in the radial direction is referred to as the "tooth-base side."

Figure 3:
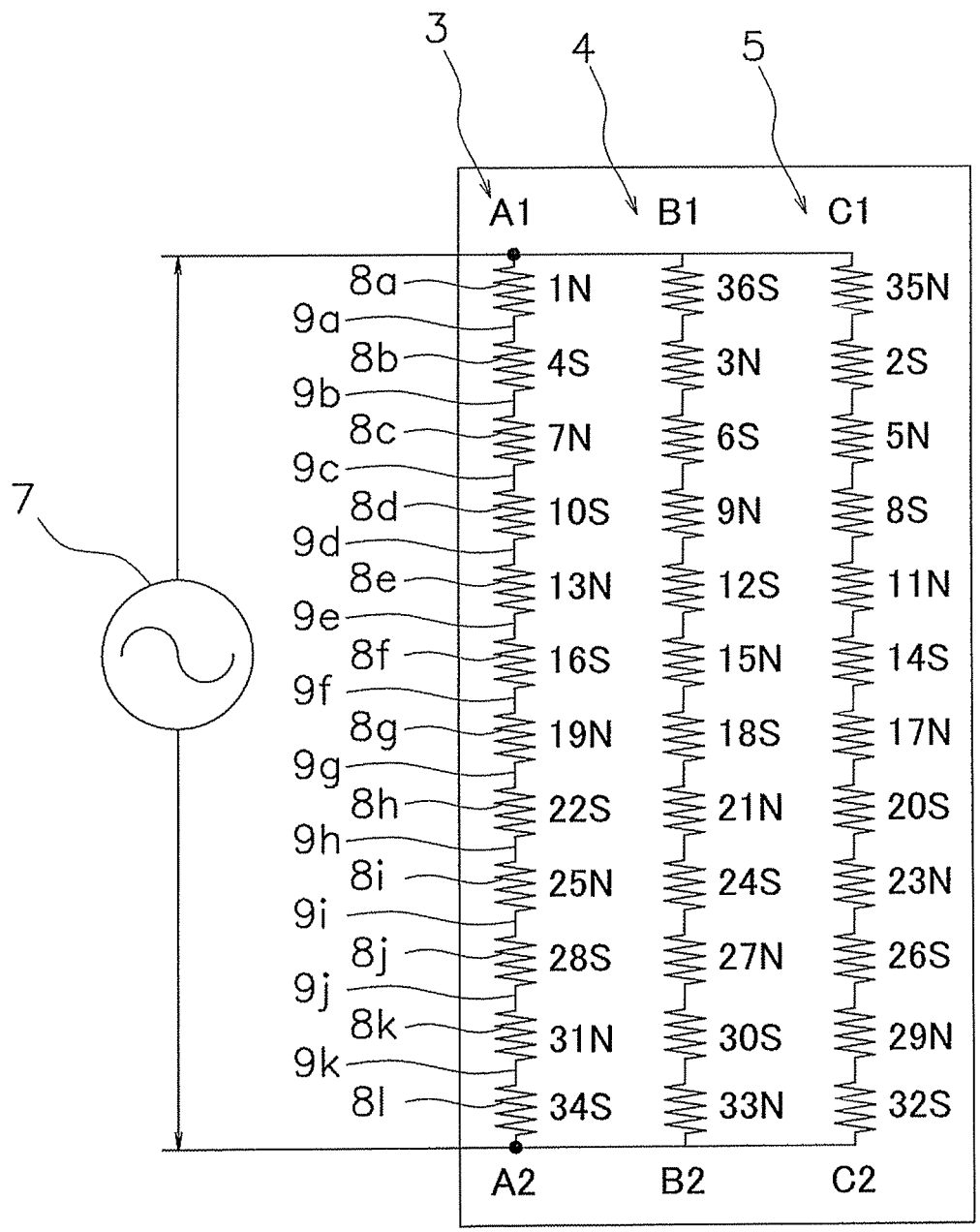
FIG. 3 is a schematic diagram showing the layout of a winding and the arrangement of each coil portion.

The windings 3 to 5 include three windings 3 to 5, i.e., a U-phase winding 3, a V-phase winding 4, and a W-phase winding 5. A U-phase first terminal A1, a V-phase first terminal B1, and a W-phase first terminal C1 are provided to one end of the U-phase winding 3, V-phase winding 4, and W-phase winding 5, respectively. A U-phase second terminal A2, a V-phase second terminal B2, and a W-phase second terminal C2 are provided to the other end of the U-phase winding 3, V-phase winding 4, and W-phase winding 5, respectively. As shown in FIG. 3, the U-phase first terminal A1, V-phase first terminal B1, and W-phase first terminal C1 are coupled to each other; the U-phase second terminal A2, V-phase second terminal B2, and W-phase second terminal C2 are coupled to each other; and each terminal is connected to a power source device 7. The windings 3 to 5 have substantially the same structure except that the inserted slots are different, and the U-phase winding 3 will therefore be described below.

The U-phase winding 3 includes 12 coil portions 8a to 8l, and 11 connecting portions 9a to 9k, as shown in FIG. 3. FIG. 3 is a schematic diagram showing the layout the U-phase winding 3. The U-phase winding 3 is composed of a plurality of wires W bundled together in an irregular arrangement (see FIG. 12), e.g., 10 wires W. The coil portions 8a to 8l and connecting portions 9a to 9k are formed by a bundle of a plurality of continuous wires W.

A single coil portion is wound around a single tooth. For example, the first coil portion 8a is wound around a first tooth T1, and is inserted into a first slot S1 and a second slot S2, as shown in FIG. 1. The second coil portion 8b is wound around a fourth tooth T4, and is inserted into a fourth slot S4 and a fifth slot S5.

In the description below, the coil portions 8a to 8l of the U-phase winding 3 are referred to as first coil portion 8a to $12^{th}$ coil portion 8l in sequence from the U-phase first terminal A1. The tooth around which the first coil portion 8a of the U-phase winding 3 is wound is referred to as the first tooth T1, and the teeth in the counterclockwise direction in FIG. 1 are referred to as first tooth T1 to $36^{th}$ tooth T36. The slot between the first tooth T1 and the 36th tooth T36 is referred to as the first slot S1, and the slots in the counterclockwise direction in FIG. 1 are referred to as the first slot S1 to $36^{th}$ slot S36.

The first coil portion 8a to $12^{th}$ coil portion 8l of the U-phase winding 3 are coupled in series, as shown in FIG. 3. The numerical portion of the reference numerals on the right side of the coil portions in FIG. 3 refers to the tooth number into which the coil portions are inserted. "N" and "S" refer to the magnetic pole formed by each coil portion. For example, the reference numeral "1N" assigned to the first coil portion 8a refers to the first coil portion 8a being wound around the first tooth T1 so as to form an N pole. The reference numeral "4S" assigned to the second coil portion 8b refers to the second coil portion 8b being wound around the fourth tooth T4 so as to form an S pole.

Figure 4:
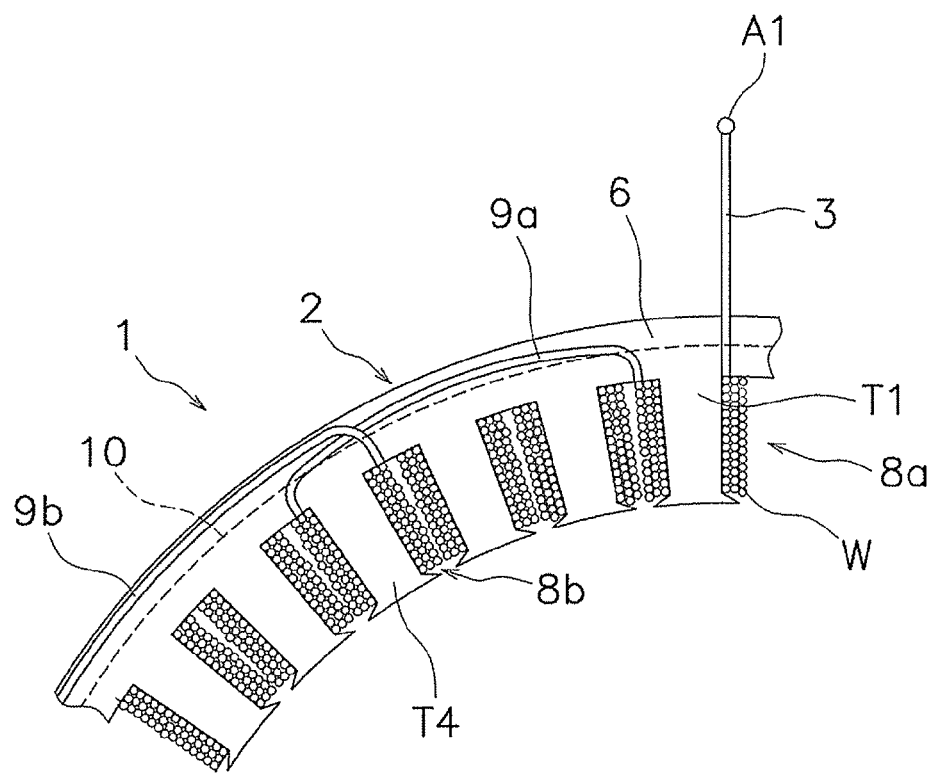
FIG. 4 is an enlarged view of a portion of a cross section of the stator.
Figure 5:
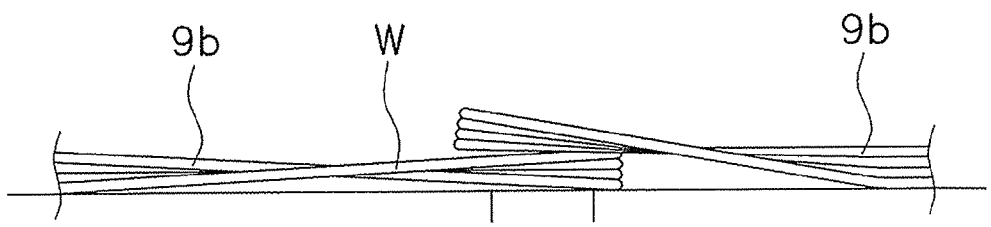
FIG. 5 is a diagram showing the bundle of wires in a connecting portion.

The connecting portions 9a to 9k are portions that connect the coil portions 8a to 8l together. The connecting portions 9a to 9k are disposed between the coil portions 8a to 8l from the tooth-base side across to the tooth-base side, as shown in FIG. 4. FIG. 4 is an enlarged view of a portion of a cross section of the stator 1. A groove 10 recessed toward the internal peripheral side is provided along the peripheral direction on the external peripheral surface of the yoke 6, and the connecting portions 9a to 9k are inserted into the groove 10. Therefore, the connecting portions 9a to 9k are disposed on the external peripheral side of the core 2. The connecting portion that connects the first coil portion 8a and the second coil portion 8b is referred to as the first connecting portion 9a and the connecting portions are referred to as first connecting portion 9a to $11^{th}$ connecting portion 9k in sequence from the U-phase first terminal A1 side in FIG. 3. The U-phase winding 3 has a shape twisted 180° in the first connecting portion 9a to $11^{th}$ connecting portion 9k (see FIG. 5).

Method for Manufacturing Stator 1

Figure 6:
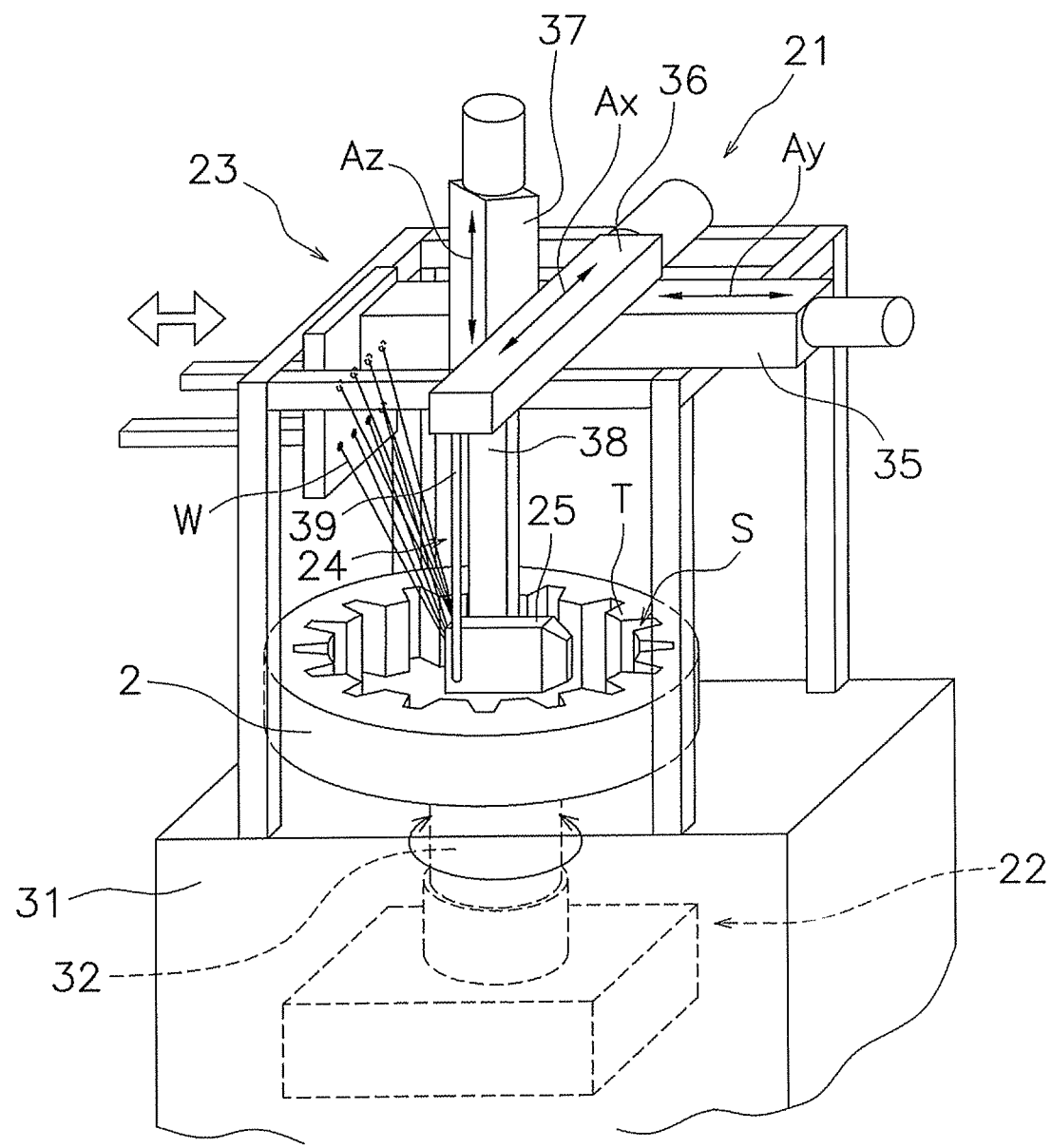
FIG. 6 is a schematic view showing the configuration of the external appearance of a winding device.

Next, the configuration of a winding device 21 for forming the windings 3 to 5 are described with reference to FIG. 6. Consider the three mutually orthogonal X-axis, Y-axis, and Z-axis below. The X-axis extends in the horizontal front-rear direction (see the arrow Ax), the Y-axis extends in the horizontal transverse direction (see the arrow Ay), and the Z-axis extends in the vertical direction (see the arrow Az).

The winding device 21 is configured so that the nozzle 25 is moved around the teeth T, and the wires W are wound around the teeth T. The winding device 21 is provided with an index mechanism 22, a nozzle movement mechanism 23, a nozzle tilt mechanism 24, a nozzle 25, and a controller 26 (see FIG. 9).

The index mechanism 22 is a device for rotating the core 2 about its central axis with respect to a pedestal 31. The index mechanism 22 is provided with an index mount 32 rotatably supported about the Z-axis with respect to the pedestal 31, and a servomotor 33 (see FIG. 9) for rotatably driving the index mount 32. The core 2 rotates about its central axis when the index mount 32 is rotatably driven by the servomotor 33 in a state in which the core 2 is secured to the index mount 32.

The nozzle movement mechanism 23 is a device for moving the nozzle 25 in the three-dimensional directions. The nozzle movement mechanism 23 has a transverse movement mount 35, a front-rear movement mount 36, an elevator mount 37, and a nozzle support member 38. The transverse movement mount 35 is moved by an electromagnetic actuator 41 (see FIG. 9) in the Y-axis direction with respect to the pedestal 31. The front-rear movement mount 36 is moved by an electromagnetic actuator 42 (see FIG. 9) in the X-axis direction with respect to the transverse movement mount 35. The elevator mount 37 is moved by an electromagnetic actuator 43 (see FIG. 9) in the Z-axis direction with respect to the front-rear movement mount 36. Known mechanisms, e.g., screw shafts, ball and screw, and servomotors are used as the electromagnetic actuators 41 to 43. The nozzle support member 38 is mounted on the elevator mount 37 and is moved in the vertical direction by the movement of the elevator mount 37. The nozzle 25 is mounted on the lower end of the nozzle support member 38.

The nozzle tilt mechanism 24 is a device for modifying the tilt angle of the nozzle 25 in relation to the nozzle support member 38. The nozzle tilt mechanism 24 is provided with a shaft 39 coupled to the rear-end part of the nozzle 25, and an electromagnetic actuator 44 (see FIG. 9) for moving the shaft 39 in the Z-axis direction. The nozzle 25 is mounted on the nozzle support member 38 so as to be capable of rotation about the axis that extends in the X-axis direction. The shaft 39 is moved by the electromagnetic actuator 44 in the Z-axis direction, whereby the angle of the nozzle 25 is modified (see FIG. 10).

Figure 7:
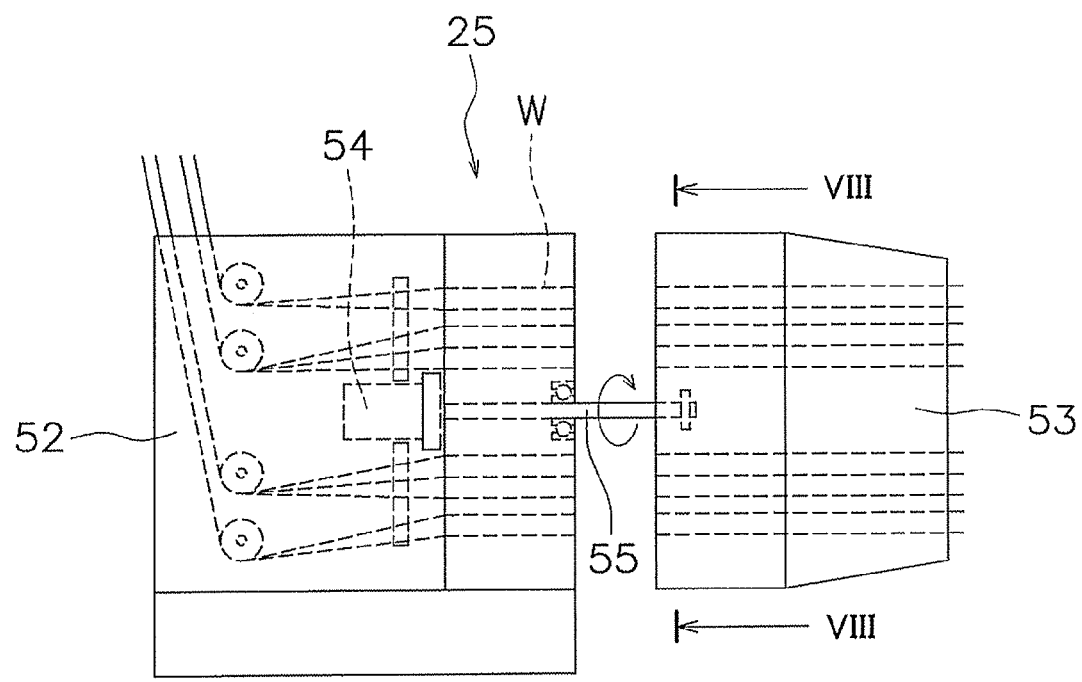
FIG. 7 is a front view showing the configuration of a nozzle.
Figure 8:
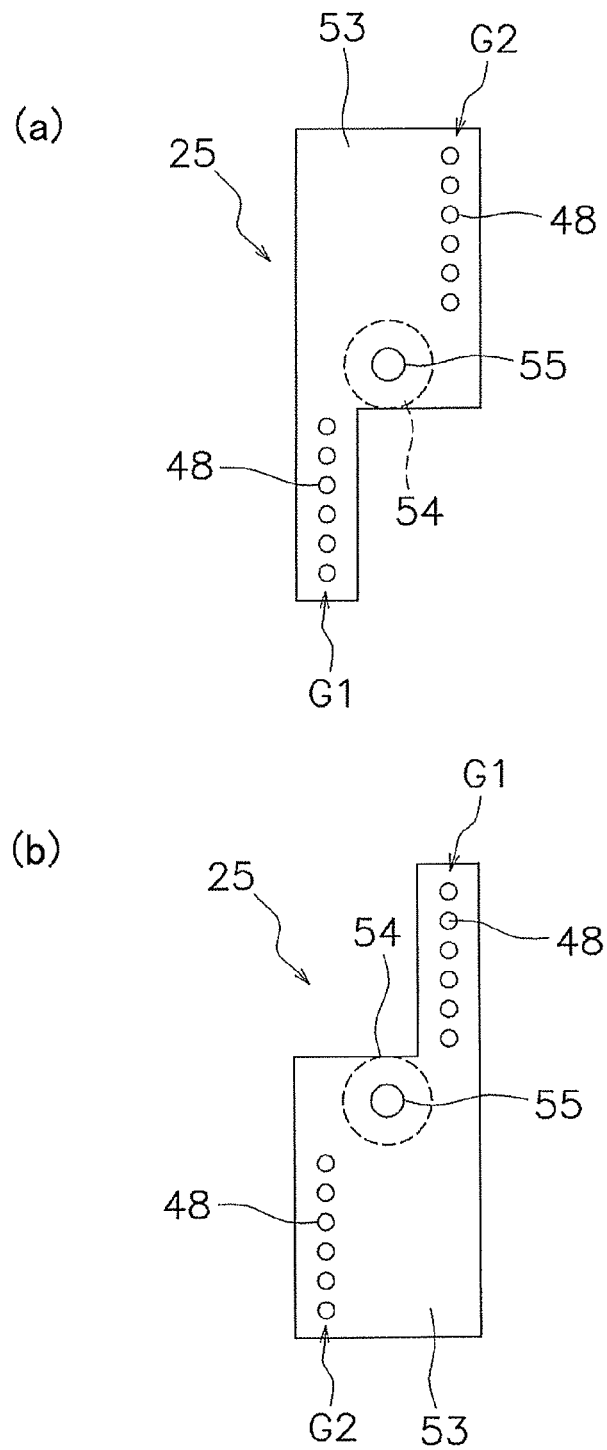
FIG. 8 is a cross-sectional view of VIII-VIII in FIG. 7.

The nozzle 25 is a device for feeding out wires W. The plurality of wires W are supplied to the nozzle 25 by a wire supply device (not shown). The nozzle 25 moves about the teeth T while simultaneously feeding out the plurality of wires W, whereby the plurality of wires W are bundled together and wound around the teeth T. In this manner, the space factor (density) of the windings 3 to 5 is increased and motor performance is improved by winding a plurality of narrow wires W in place of a thick wire W. The nozzle 25 is formed in a longitudinal cross-sectional shape so as to be capable of being inserted into the slots S between the teeth T, as shown in FIGS. 7 and 8. A plurality of guide holes 48 through which the wires W are inserted are formed in the nozzle 25, and the plurality of guide holes 48 are open in alignment at predetermined intervals at the distal end of the nozzle 25. A plurality of wires W or a single wire W may be passed through a single guide hole 48.

The nozzle 25 has a nozzle-inverting mechanism for twisting a bundle of wires W in the connecting portions 9a to 9k as described above. The nozzle-inverting mechanism has a fixed part 52, a moveable part 53, and a motor 54, as shown in FIG. 7. The fixed part 52 is a portion on the rear-end side of the nozzle 25 and is mounted on the nozzle support member 38. The moveable part 53 is mounted so as to be capable of rotating around a rotation axis 55 that extends in the horizontal direction with respect to the fixed part 52. The plurality of guide holes 48 described above are open at the distal end of the moveable part 53. The plurality of guide holes 48 are arranged in two groups with the rotation axis 55 disposed therebetween, as shown in FIG. 8. The guide holes 48 of one group G1 (hereinafter referred to as "first group G1") are arranged in a single row in the height direction of the nozzle 25, and are arranged offset in the thickness direction of the nozzle 25 with respect to the rotation axis 55. In this configuration, the vertical direction in relation to the page of FIG. 8 is referred to as the "height direction of the nozzle 25," and the transverse direction in relation to the page of FIG. 8 is referred to as the "thickness direction of the nozzle 25." The guide holes 48 of the other group G2 (hereinafter referred to as "second group G2") are similarly arranged in a single row in the height direction of the nozzle 25, and the guide holes 48 of the second group G2 are arranged offset in the thickness direction of the nozzle 25 with respect to the guide holes 48 of the first group G1. The motor 54 rotatably moves the moveable part 53 with respect to the fixed part 52. FIG. 8(b) shows a state in which the moveable part 53 is rotated 180° from the state shown in FIG. 8(a).

Figure 9:
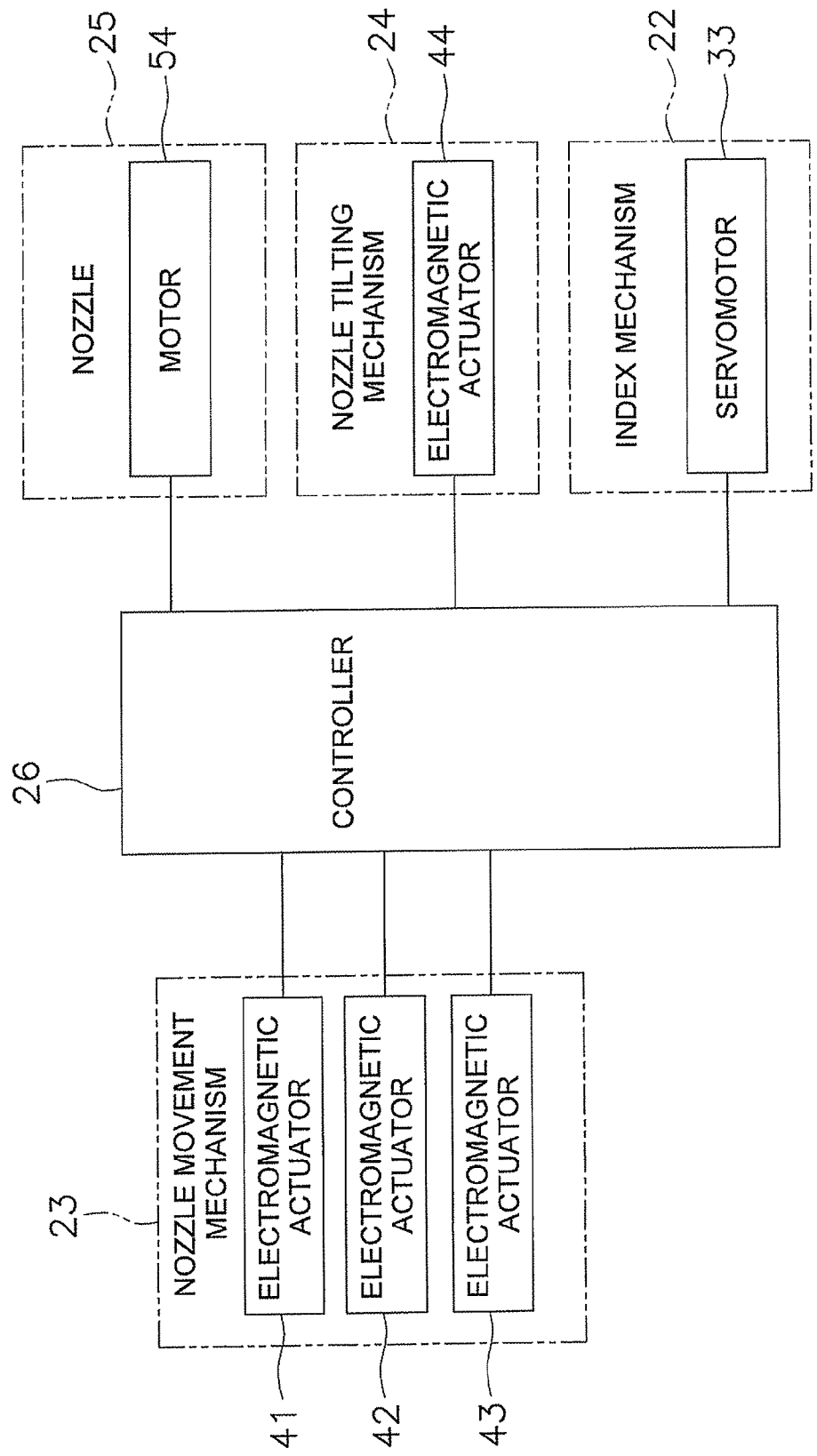
FIG. 9 is a control block view showing the configuration of the winding device.
Figure 10:
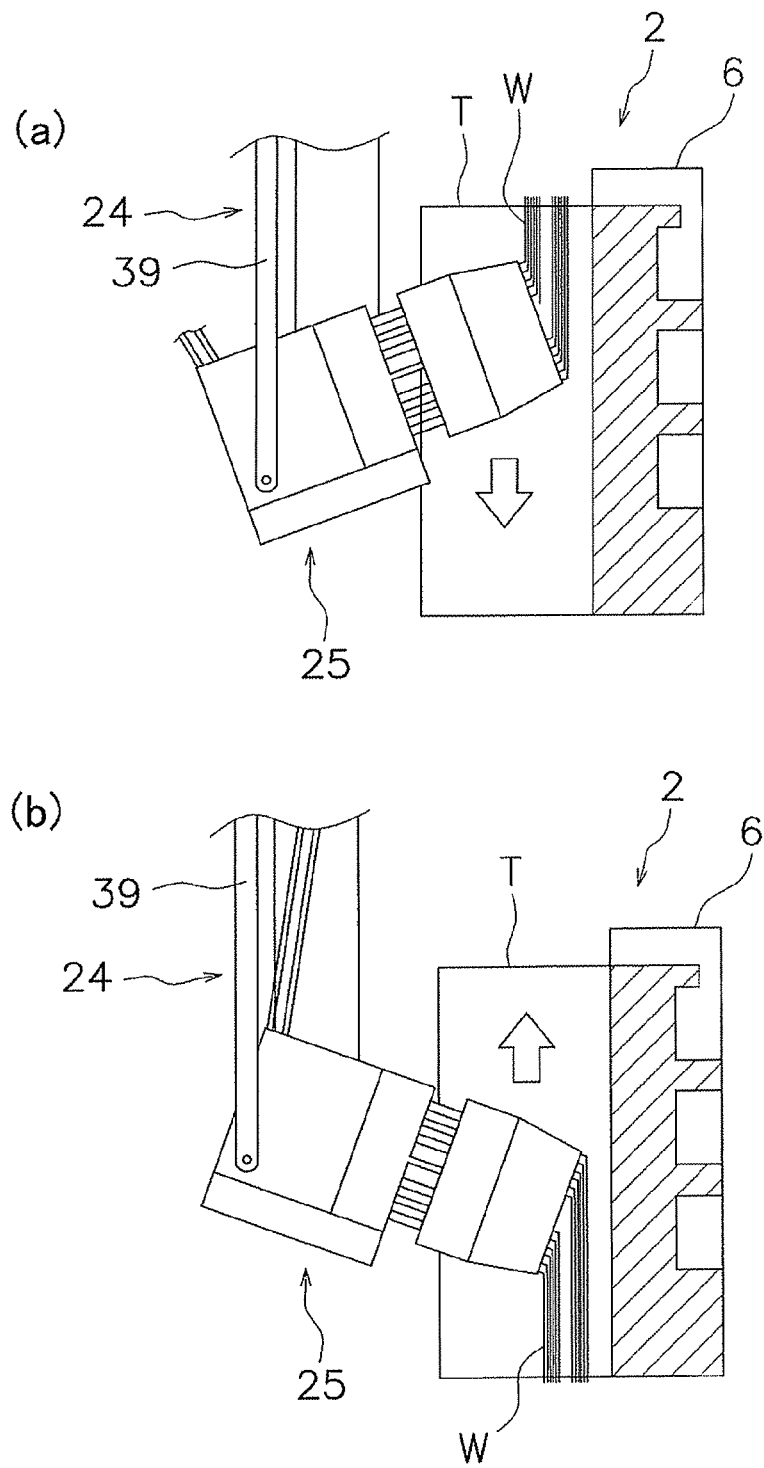
FIG. 10 is a diagram showing the operation of the nozzle during formation of the coil portion.

The controller 26 shown in FIG. 9 controls the movement of the nozzle 25 by controlling the various electromagnetic actuators 41 to 43 of the nozzle movement mechanism 23. The controller 26 controls the orientation of the nozzle 25 by controlling the electromagnetic actuator 44 of the nozzle tilt mechanism 24 and the motor 54 of the nozzle. The controller 26 controls the rotational position of the core 2 by controlling the servomotor of the index mechanism 22. A program for forming the windings 3 to 5 as described above is stored in the controller 26, and the controller 26 automatically controls the operation of the core 2 and nozzle 25 in accordance with the program.

In this winding device 21, the nozzle 25 moves around the teeth T while feeding out a plurality of wires W from the guide holes 48, whereby a bundle of wires W is wound around the teeth T to form coil portions. The windings 3 to 5 of the stator 1 described above are formed by continuously forming a plurality of coil portions and connecting portions. Described below is the operation of the nozzle 25 controlled by the controller 26 described above.

The nozzle 25 descends from above the core 2 and the distal end of the nozzle 25 descends through the interior of a slot S between the teeth T, as shown in FIG. 10(a). The nozzle 25 stops when the nozzle 25 reaches below the core 2, and the core 2 rotatably moves a distance equal to a single tooth. The nozzle 25 thereafter rises and the distal end of the nozzle 25 rises through the interior of the adjacent slot S, as shown in FIG. 10(b). When the nozzle 25 reaches above the core 2, the core 2 rotates a single rotation in order to return the twisting of the wires W, and the previous slot S thereafter returns below the nozzle 25. The nozzle 25 descends again and the distal end of the nozzle 25 descends through the slot S. At this point, the nozzle 25 descends with the position offset from the previous winding position in the radial direction. The operation described above is repeated, whereby the bundle of the wires W is wound around the teeth T while being offset in position in the radial direction.

Figure 11:
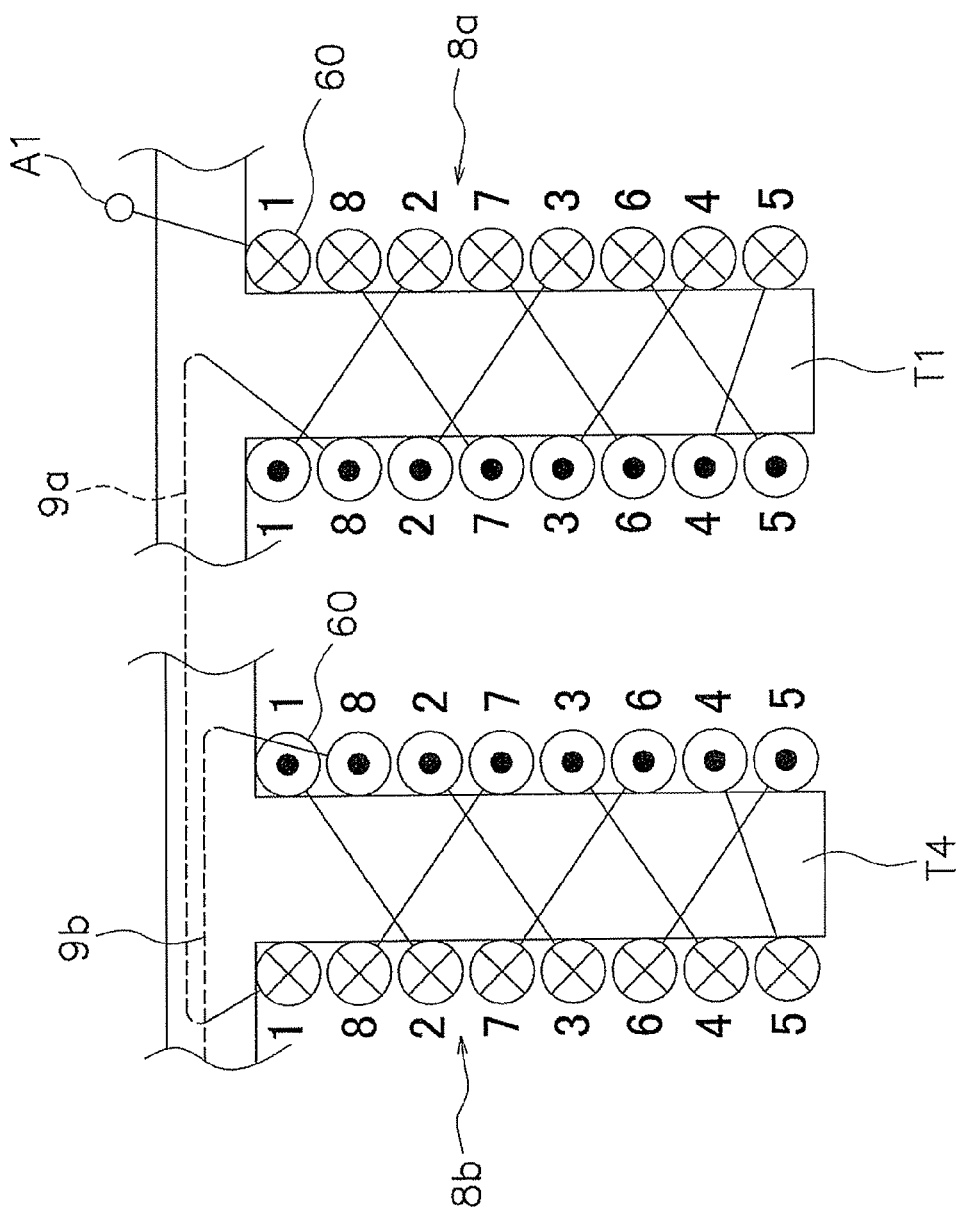
FIG. 11 is a diagram showing the winding sequence of the windings in the coil portion.

Specifically, the nozzle 25 starts from the tooth-base side of a tooth T and winding of the wires W is repeated while the position is offset toward the tooth tip on each turn. For example, FIG. 11 shows the winding sequence of the wires W in the first coil portion 8a and the second coil portion 8b. In FIG. 11, a single circle 60 schematically shows a bundle of the plurality of wires W wound a single turn. The "X" marked in the circles 60 shows that the wires W have been wound from the nearside of the page toward the depth side. The "•" marked in the circles 60 shows that the wires W have been wound from the depth side of the page toward the nearside. The number marked to the side of the circles 60 shows the turn number in which the wires W are wound. In the first turn, the wires W are wound on the most tooth-base side of the first tooth T1 in the first coil portion 8a, as shown in FIG. 11. When the winding position arrives at the tooth tip of the first tooth T1 in the fifth turn, the winding of the wires W is thereafter repeated while the position is offset toward the tooth base. When the winding position arrives at the tooth base of the first tooth T1 in the eighth turn, the formation of the first coil portion 8a is completed. The second coil portion 8b is formed thereafter. In the formation of the second coil portion 8b, the wires W are wound onto a second tooth T2 in the reverse direction from that of the first coil portion 8a.

Figure 12:
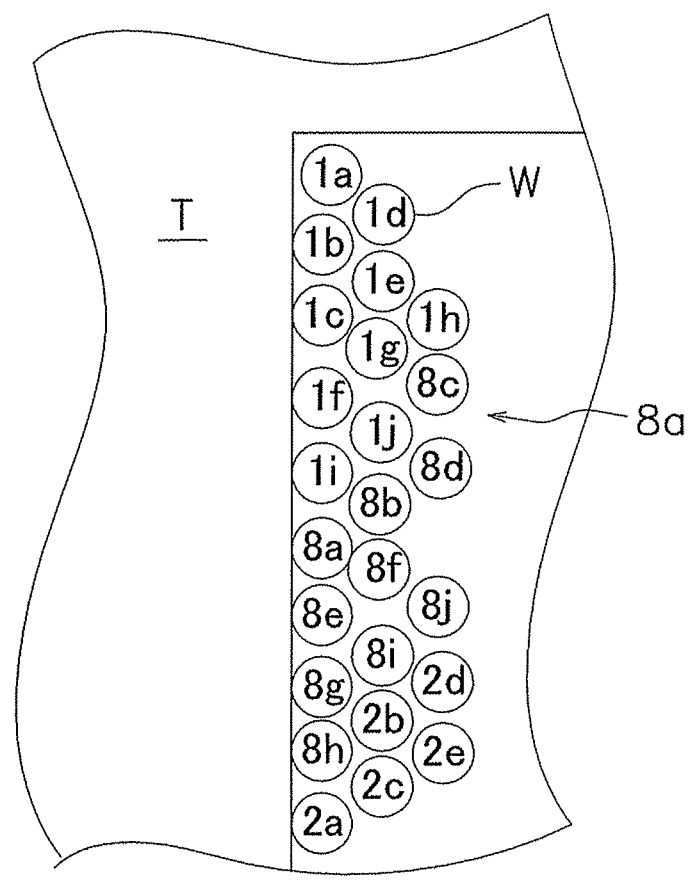
FIG. 12 is an enlarged view showing the arrangement of the wires in each of the turns in the coil portion.

Between the formations of the coil portions as described above, the arrangement of the individual wires W included in a single bundle is not controlled because the wires W are wound as a bundle onto the teeth. Accordingly, individual wires W are wound in an irregular arrangement on the teeth T, as shown in FIG. 12. The numbers marked inside the circles in FIG. 12 show the turn number in which the wires W are wound on the teeth T.

In this manner, individual wires W are wound in an irregular arrangement on the teeth T, but the wires W are smoothly fed out without making contact with each other because the wires W are fed out from the nozzle 25 with predetermined spacing from each other. As a result, the wires W are prevented from becoming intertwined due to friction with each other, the space factor (density) of the windings 3 to 5 is increased, and the performance of the motor 54 is improved.

When the nozzle 25 moves between the teeth T while feeding out the plurality of wires W, the tilt angle of the nozzle 25 is changed by the nozzle tilt mechanism 24. For example, on descending, the nozzle 25 is rotated so that the distal end of the nozzle 25 is tilted upward, as shown in FIG. 10(a). On ascending, the nozzle 25 is rotated so that the distal end of the nozzle 25 is tilted downward, as shown in FIG. 10(b). The friction between the wires W fed out from the nozzle 25 is thereby reduced and the wires W can be effectively prevented from becoming intertwined.

Figure 13:
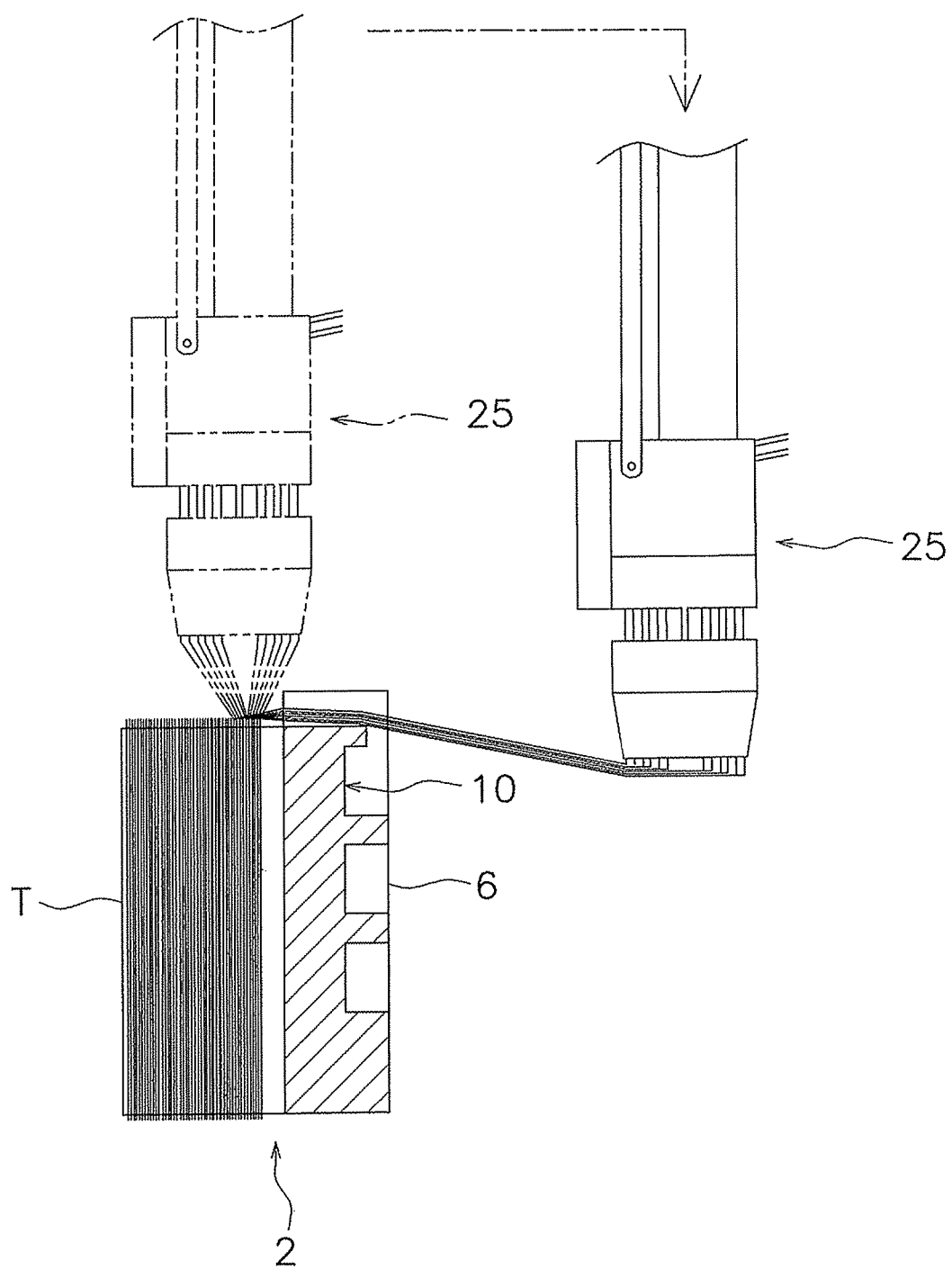
FIG. 13 is a diagram showing the operation of the nozzle during formation of a connecting portion.

When the formation of a single coil portion has been completed, the distal end of the nozzle 25 rotates to face downward so that the center of the bundle of wires W and the center of the nozzle 25 match (see nozzle 25 shown by the alternate long and two short-dashes line of FIG. 13). In this state, the bundle of wires W is twisted 180° when the moveable part 53 of the nozzle 25 is rotated 180° by the nozzle-inverting mechanism. At this point, the wires W fed out from the nozzle 25 are twisted while remaining mutually offset because the guide holes 48 are in the offset arrangement described above. Contact between the wires W is thereby reduced when the moveable part 53 of the nozzle 25 is rotated. The plurality of wires W fed out from the nozzle 25 can be twisted without loss of tension balance between the wires and the connecting portions can be stably formed by twisting the wires W in a state in which the center of the bundle of wires matches the center of the nozzle 25. The nozzle 25 thereafter moves over the yoke 6 from above the teeth T and moves to the external peripheral side of the core 2 (see nozzle 25 shown by the solid line in FIG. 13). The distal end of the nozzle 25 thereby moves to a position facing the groove 10 provided to the external peripheral surface of the core 2. Rotating of the core 2 causes the bundle of wires W drawn out from the nozzle 25 to fall into the groove 10 of the core 2, and the first connecting portion 9a to be formed, as shown in FIG. 4. In this manner, the connecting portions 9a to 9k for connecting the coil portions 8a to 8l together are formed between the formations of the coil portions 8a to 8l, respectively, by the continuous bundle of wires W from the coil portions 8a to 8l, and are accommodated in the groove 10.

The nozzle 25 passes over the yoke 6 and returns to the internal peripheral side of the core 2. The nozzle 25 moves in the same manner as described above around the next tooth T to thereby form the next coil portion.

Characteristics

Figure 14:
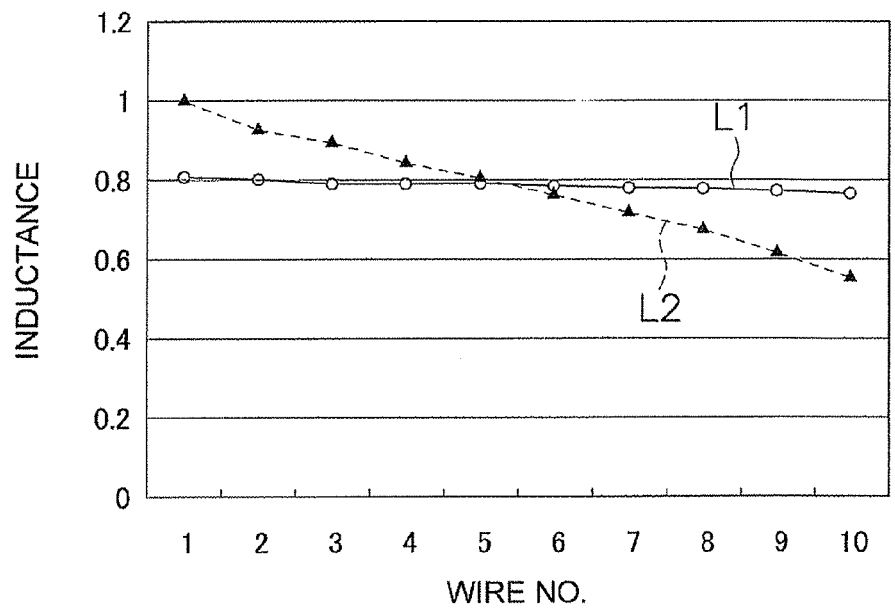
FIG. 14 is a graph showing the inductance of wires.

FIG. 14 shows the data comparing the inductance of individual wires W in the stator 1 according to the present embodiment and a conventional stator in which the windings are not twisted in the connecting portions. Line L1 shows the inductance of wires W of the stator 1 of the present embodiment. Line 2 show the inductance of wires W of a conventional stator. It is apparent from FIG. 14 that in comparison with a conventional stator, inductance nonuniformity is reduced in a plurality of wires W constituting the windings 3 to 5 in the stator 1 according to the present embodiment. An electric motor provided with the stator 1 according to the present embodiment can thereby achieve a higher coil efficiency than an electric motor provided with a conventional stator. It is possible for output to be increased, the size to be reduced, and the weight to be lowered, relative to the prior art.

With the stator 1 according to the present embodiment, the windings 3 to 5 have a twisted shape in the connecting portions. For this reason, the inductance nonuniformity of the wires W is reduced, and the motor efficiency can be improved. Each of the windings 3 to 5 is composed of a plurality of wires W bundled in an irregular arrangement. Accordingly, the requirement for positional precision of the wires W thus wound is less in comparison with the case in which the wires W are wound on the teeth T in a regular arrangement. Therefore, the coil portions can be formed by moving the nozzle 25 while the plurality of wires W is fed out to the undivided and integrally formed core 2, as described above. The operation for twisting the wires W when the connecting portions are formed can also be readily carried out by a nozzle-inverting mechanism. Accordingly, the manufacturing step can be readily automated.

With the stator 1 according to the present embodiment, the distance between the connecting portions and the adjacent coil portions can be increased in comparison with the case in which a connecting portion is provided from the base of a tooth T (e.g., first tooth T1 of FIG. 11) across to the tooth tip of another tooth T (e.g., the tooth T4 of FIG. 11). Non-conductivity between the connecting portions and adjacent coil portions can thereby be improved. Since the connecting portions are arranged on the external peripheral side of the core 2, the non-conductivity between the connecting portions and adjacent coil portions can be further improved. Motor efficiency can thereby be further improved.

Other Embodiments (a) The number of slots S and teeth T of the core 2, the number of wires W constituting the windings 3 to 5, and the number of coil portions and connecting portions is not limited to the numbers in the description above, and it is possible to use different numbers.

(b) In the embodiment described above, the stator 1 is shown as an example of the armature according to the present invention, but the present invention may also be applied to a rotor. The stator 1 described above is an internally toothed stator, but it is also possible to use an externally toothed stator in which the teeth project outward in the radial direction from the external peripheral surface of the yoke.

(c) In the embodiment described above, a shape is used in which the windings 3 to 5 are twisted in all of the connecting portions, but it is also possible to use a shape in which the windings 3 to 5 are twisted in some of the connecting portions.

(d) In the embodiment described above, the windings 3 to 5 are twisted 180° in a single connecting portion, but may also be divided among a plurality of connecting portions and twisted a total of 180°. The bulging of the windings 3 to 5 due to being twisted can be reduced in comparison with the case in which the windings 3 to 5 are twisted 180° in a connecting portion of a single location.

(e) The direction in which the bundle of wires W is twisted in the connecting portions may be partially different directions rather that entirely the same direction. For example, the U-phase winding 3 may be twisted 180° in a predetermined direction in the first connecting portion 9a, and the U-phase winding 3 in the second connecting portion 9b may be twisted 180° in the direction opposite from that in the first connecting portion 9a. The amount of twisting for the U-phase winding 3 overall can thereby be reduced. The same applies to the V-phase winding 4 and W-phase winding 5.

The twisting may be divided among a plurality of connecting portions for a total of 180° in a predetermined direction, and total of 180° in the direction opposite from the predetermined direction.

(f) An example of the three-phase synchronous motor provided with the stator described above is a switched reluctance motor (SR motor), and the present invention may also be applied to a stator provided in other types of motors.

(g) In the embodiment described above, the nozzle 25 is moved between the teeth T to wind the wires W onto the teeth T. However, the wires W may be wound onto the teeth T by the winding device 80 shown in FIGS. 15 and 16. The winding device 80 has a nozzle 25 for feeding out wires W in the same manner as the winding device 21 of the embodiment described above. However, the nozzle 25 moves along the teeth T on the outer side between the teeth T. The winding device 80 has an upper catch device 81 and a lower catch device 82. The upper catch device 81 is arranged above the core 2 and has a catch member 83 and a catch member movement mechanism 84. The catch member 83 has a hook shape that can catch the bundle of the wires W. The catch member 83 is rotatably mounted on the catch member movement mechanism 84. The catch member movement mechanism 84 moves the catch member 83 in the radial direction (see arrow Ay) of the core 2. The catch member movement mechanism 84 rotates the catch member 83. The lower catch device 82 has a catch member 85 and a catch member movement mechanism 86, and has the same configuration as the upper catch device 81. The configuration of the winding device 80 is otherwise the same as the winding device 21.

Figure 15:
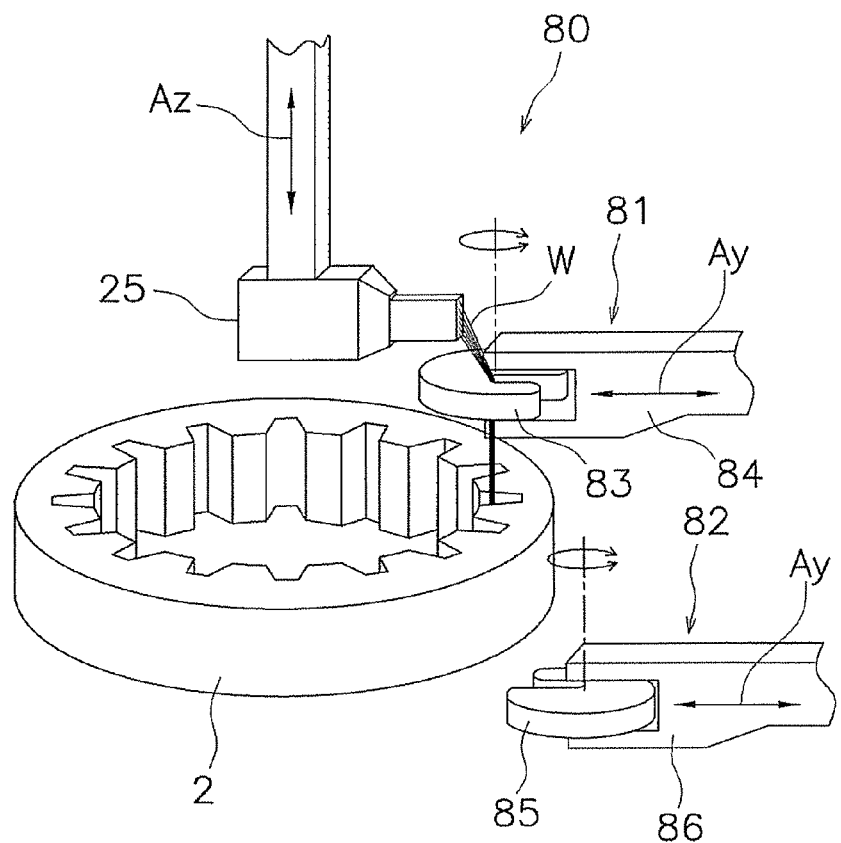
FIG. 15 is a schematic view of the configuration of the external appearance of a winding device according to another embodiment.
Figure 16:
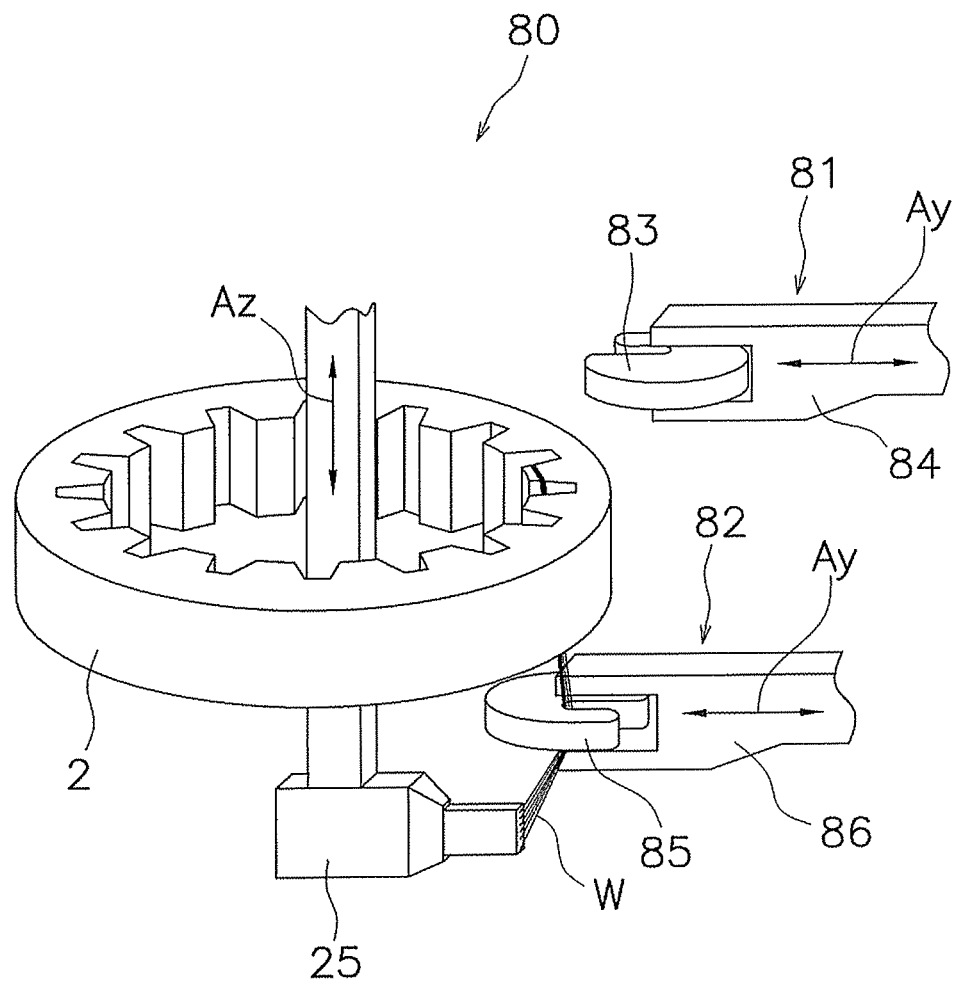
FIG. 16 is a schematic view of the configuration of the external appearance of a winding device according to another embodiment.

With the winding device 80, the nozzle 25 moves (see arrow Az) along the teeth T on the outer side between the teeth T while feeding out wires W. When the nozzle 25 arrives above the core 2, the catch member 83 of the upper catch device 81 rotates and catches the plurality of wires W fed out from the nozzle 25, and the catch member 83 moves to the outer side in the radial direction of the core 2, as shown in FIG. 15, whereby a bundle of wires W is inserted between the teeth T. The nozzle 25 descends after the core 2 has rotatably moved a distance equal to a single tooth T. When the nozzle 25 arrives below the core 2, the catch member 83 of the upper catch device 81 rotates in the direction opposite of that noted above and releases the bundle of wires W, as shown in FIG. 16. The catch member 85 of the lower catch device 82 rotates, catches the wires W, and moves to the outer side of the core 2 in the radial direction, whereby the bundle of wires W is inserted between the teeth T. Bundles of the wires W are wound around the teeth T by repeating the operation described above.

When the formation of a single coil portion has been completed, the nozzle 25 moves to the external peripheral side of the core 2 in the same manner as the embodiment described above, and a connecting portion is formed by rotating the core 2. At this time, the nozzle 25 is inverted by the nozzle-inverting mechanism, whereby twisting is applied to the connecting portion in the same manner as the embodiment described above.

With this winding device 80, the wires W can be directly wound onto the teeth T even when the space between the teeth T is narrow and it is difficult to insert the nozzle 25.

The illustrated embodiment has the effect of improving the motor efficiency, and is useful as an armature of an electric motor and as a method for manufacturing an armature of an electric motor.

The invention claimed is:

1. An armature of an electric motor comprising:
   a core including a plurality of slots and a plurality of teeth formed between the slots; and
   a winding made of a plurality of wires bundled together in an irregular arrangement, the winding including a plurality of coil portions wound around each of the teeth, and a plurality of connecting portions connecting the coil portions together, the winding being wound around one of the teeth in a plurality of turns, the plurality of wires being arranged in an irregular fashion so that positions of at least a portion of the wires are different on each turn in a radial direction and a peripheral direction of the core, the winding having a twisted shape around a center of a bundle of the plurality of wires in the connecting portions.

2. The armature of an electric motor according to claim 1, wherein
   the winding includes at least three of the wires.

3. The armature of an electric motor according to claim 1, wherein
   the connecting portions extend from a base of one of the teeth to a base of another of the teeth.

4. The armature of an electric motor according to claim 1, wherein
   the teeth are provided on an inner peripheral side of the core, and the connecting portions are disposed on an outer peripheral side of the core.

5. The armature of an electric motor according to claim 1, wherein
   the core is integrally formed as a one-piece unitary member.

6. The armature of an electric motor according to claim 1, wherein
   the connecting portions include a first connecting portion in which the winding is twisted 180° in a predetermined direction, and a second connecting portion in which the winding is twisted 180° in a direction opposite the predetermined direction.

7. The armature of an electric motor according to claim 1, wherein
   the winding is twisted a total of 180° among the plurality of the connecting portions.

8. The armature of an electric motor according to claim 7, wherein
   the connecting portions include a first connecting portion in which the winding is twisted in a predetermined direction, and a second connecting portion in which the winding is twisted in a direction opposite the predetermined direction.

9. A method for manufacturing an armature of an electric motor comprising:
   winding a bundled plurality of wires in an irregular arrangement around a plurality of teeth formed on a core, and thereby forming a plurality of coil portions wound around each of the teeth, the bundled plurality of wires being wound around one of the teeth in a plurality of turns, the plurality of wires being arranged in an irregular fashion so that positions of at least a portion of the wires are different on each turn in a radial direction and a peripheral direction of the core; and
   forming a plurality of connecting portions that connect the coil portions together using the wires continuing from the coil portions, and twisting the bundled plurality of wires around a center of the bundled plurality of wires in the connecting portions, between formations of each of the coil portions.

10. The method for manufacturing an armature of an electric motor according to claim 9, wherein
    the forming of the coil portions wound around each of the teeth includes winding the wires onto the teeth by moving a nozzle for feeding out the plurality of the wires between the teeth.

11. The method for manufacturing an armature of an electric motor according to claim 9, wherein
    the forming of the coil portions wound around each of the teeth includes winding the wires onto the teeth by moving a nozzle for feeding out the plurality of the wires along the teeth, and catching and inserting by a catch member, between the teeth, the plurality of the wires fed out from the nozzle.

12. The method for manufacturing an armature of an electric motor according to claim 9, wherein
    the forming of the connecting portions includes forming the connecting portions so that the connecting portions extend from a base of one of the teeth to a base of another of the teeth.

13. The method for manufacturing an armature of an electric motor according to claim 9, wherein
    the forming of the connecting portions includes forming the connecting portions so that the connecting portions are provided on an external side in a radial direction of the core.

14. The method for manufacturing an armature of an electric motor according to claim 9, wherein
    the core is integrally formed as a one-piece unitary member.

15. The method for manufacturing an armature of an electric motor according to claim 9, wherein
the forming of the connecting portions includes forming a first connecting in which the wires are twisted 180° in a predetermined direction, and forming a second connecting portion in which the wires are twisted 180° in a direction opposite the predetermined direction.

16. The method for manufacturing an armature of an electric motor according to claim 9, wherein
the forming of the connecting portions includes twisting the wires a total of 180° among the plurality of the connecting portions.

17. The method for manufacturing an armature of an electric motor according to claim 16, wherein
the forming of the connecting portions includes forming a first connecting in which the wires are twisted in a predetermined direction, and forming a second connecting portion in which the wires are twisted in a direction opposite the predetermined direction.

18. The method for manufacturing an armature of an electric motor according to claim 9, wherein
the winding of the bundled plurality of wires includes winding at least three of the wires together.

* * * * *